United States Patent [19]

Gerthoffer et al.

[11] 4,254,801

[45] Mar. 10, 1981

[54] QUICK-ACTING CLOSURE UNIT

[76] Inventors: Bernard P. Gerthoffer, 304 Cornwall Dr.; John S. Kolwaite, 101 Dunham Rd., both of DeWitt, N.Y. 13214

[21] Appl. No.: 44,117

[22] Filed: May 31, 1979

[51] Int. Cl.³ .......................... F16L 37/18; F16L 55/10
[52] U.S. Cl. ...................................... 138/89; 285/312; 285/315; 285/337; 285/DIG. 19
[58] Field of Search .................. 138/89; 285/312, 315, 285/311, DIG. 19, 337

[56] References Cited

U.S. PATENT DOCUMENTS

| | | | |
|---|---|---|---|
| 3,799,207 | 3/1974 | Richardson et al. | 138/89 |
| 3,868,132 | 2/1975 | Racine | 285/312 |
| 3,977,702 | 8/1976 | White et al. | 285/337 |
| 4,142,739 | 3/1979 | Billingsley | 285/15 |

*Primary Examiner*—Steven L. Stephan

*Attorney, Agent, or Firm*—Bruns & Jenney

[57] ABSTRACT

A quick-acting closure unit for temporarily sealing the open end of a line used to convey a fluid under pressure. A cylindrical sleeve having a lower section that is tapered inwardly is passed over the open end of the line which contains a collapsible jaw means slidably mounted within the lower section that encircles the line. A cup-like member, which is also slidably mounted in the sleeve, is passed over the open end of the line and contains a sealing assembly that, when compressed, produces a fluid-tight seal between the cup and the line. A camming lever is arranged to act between the sleeve and the cup to force the cup downwardly into driving contact with the jaw means. The downward movement of the cup initially causes the seal to be compressed thereby closing off the line and then forces the jaws into holding contact with the line to secure the unit in a sealing posture thereon.

10 Claims, 3 Drawing Figures

QUICK-ACTING CLOSURE UNIT

BACKGROUND OF THE INVENTION

This invention relates to a quick-acting closure unit for temporarily closing off a line used to convey a fluid under pressure and, in particular, to a quick-acting closure device that is able to be rapidly and securely attached to the open end of a fluid line without causing serious line damage.

In the construction of multiple-story buildings, it is desirous to bring water up to each floor as quickly as possible to better facilitate completion of the work. Accordingly, it is the practice to install the vertical risers, which are used to carry water to the various floors of the building, in a floor by floor sequence with new sections being added as each new floor is erected. The water lines thus, in a sense, follow the work as it progresses. The end of the riser thus must be temporarily closed off at each floor level until such time as the next level is ready for completion. Closure of the line has heretofore been accomplished generally by threading some type of cap onto the end of the line or driving a plug therein. In any event, the closure device usually would severely damage the line whereby the damaged portion would have to be cut away before a new section could be added. This procedure has proven to be not only inconvenient and troublesome but also time-consuming, wasteful and costly.

Similarly, many sub-assemblies that are eventually connected into pressurized fluid systems must be thoroughly tested before the unit is delivered into the field. Typically, one or more lines used to join the unit to the system must be temporarily closed off while the tests are being conducted. Here again, providing a good reliable seal without causing damage to the lines oftentimes proves to be a problem.

SUMMARY OF THE INVENTION

It is therefore an object of the present invention to improve quick-acting closure units used to temporarily close off fluid lines.

Another object of the present invention is to minimize the amount of line damage caused by a unit used to temporarily close off the line.

A still further object of the present invention is to eliminate the need of cutting away a section of a fluid line in the event the line has been temporarily sealed off.

Yet another object of the present invention is to provide a quick-acting closure unit that can be rapidly and securely applied to a line used to carry a fluid under pressure without causing serious damage to the line.

A further object of the present invention is to provide a quick-acting closure unit for temporarily sealing off pressurized fluid lines which can be reused any number of times.

A still further object of the present invention is to conveniently bring water to each floor of a multi-story building during construction in a floor by floor sequence to enable each floor to be completed in a rapid and orderly manner.

These and other objects of the present invention are attained by means of a quick-acting closure unit for temporarily closing off a line for carrying fluid under pressure that includes a sleeve having an inwardly tapered lower section that that can be slipped over the open end of the line to be sealed off. A collapsible jaw is slidably mounted within the tapered section of the sleeve that encircles the line. A cup, that is also slidably mounted within the sleeve, is passed over the end of the line and contains a compressible seal assembly that is capable, when compressed, of developing a fluid-tight seal between the cup and the line. Camming means, arranged to act between the sleeve and the cup, forces the cup downwardly into driving contact against the jaws whereupon the seal assembly is initially compressed sufficiently to provide the desired fluid-tight closure and the jaws then caused by the sleeve taper to collapse into locking contact against the line to hold the entire unit in a sealing posture upon the line.

BRIEF DESCRIPTION OF THE DRAWINGS

For a better understanding of these and other objects of the present invention reference is had to the detailed description of the invention which is to be read in conjunction with the accompanying drawings, wherein.

DESCRIPTION OF THE INVENTION

Figure 1:
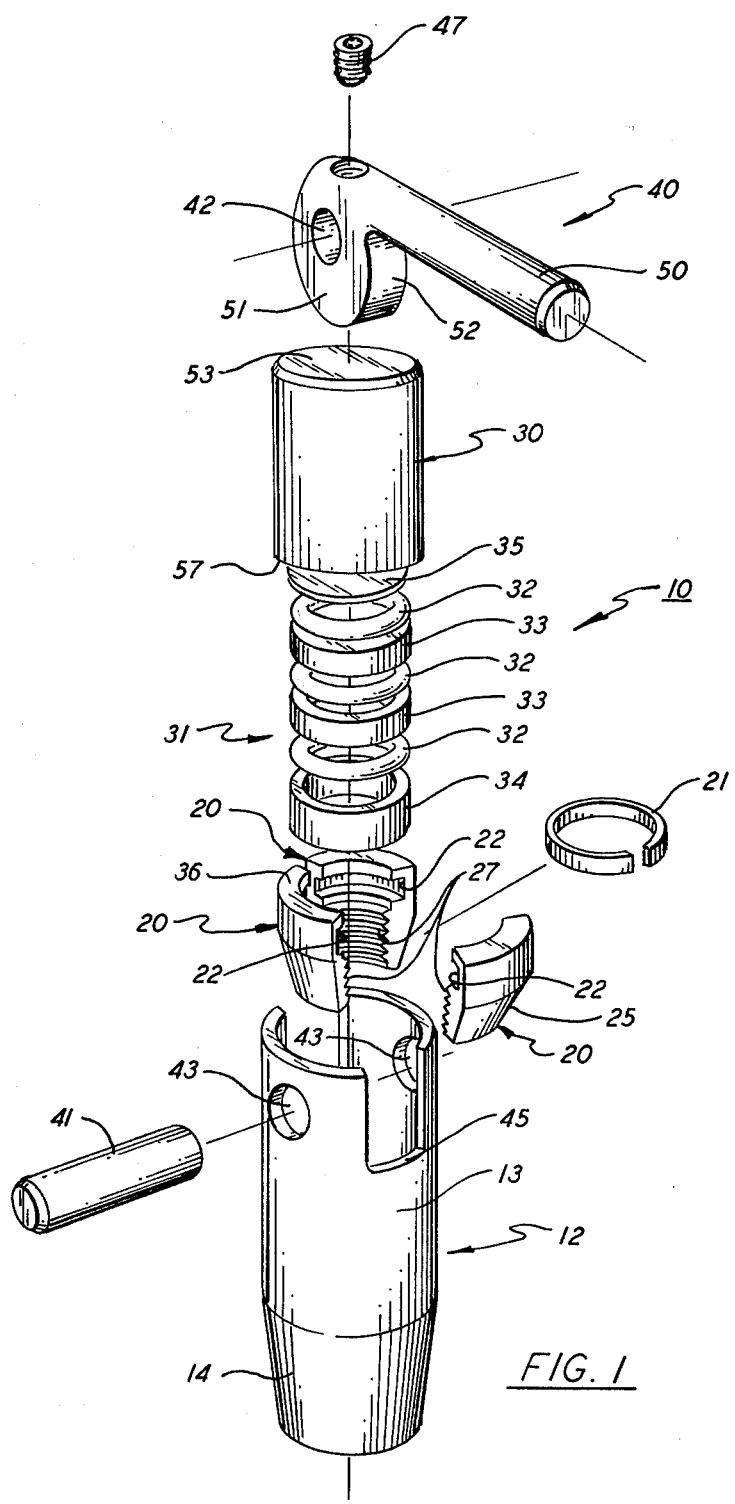
FIG. 1 is an exploded perspective view of a closure unit embodying the teachings of the present invention.
Figure 3:
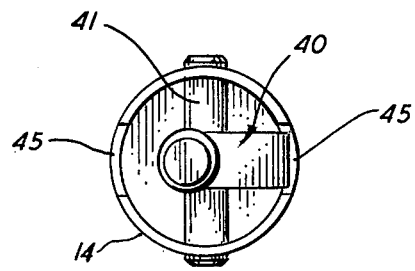
FIG. 3 is a top elevation of the apparatus shown in FIG. 2 further illustrating a camming lever used therein.
Figure 2:
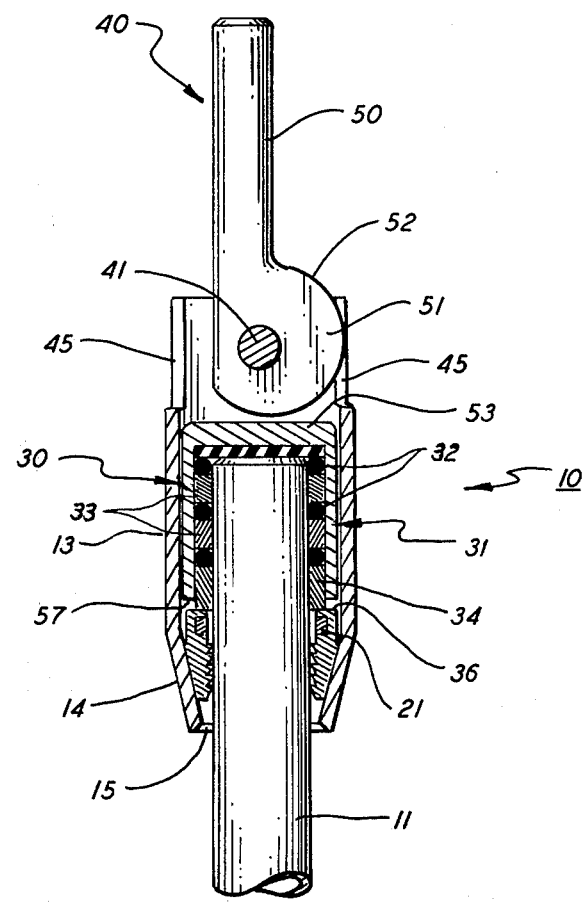
FIG. 2 is a side elevation in section showing the apparatus of the present invention being employed to close off the open end of a line for conveying a fluid under pressure.

Referring to the drawings, there is depicted a quick-acting closure unit, generally referenced 10, that embodies the teachings of the present invention. The unit is specifically designed to temporarily close off a line 11 as typically used to convey a fluid under pressure. The term "fluid", as herein used, refers to any substance that is in a liquid, vapor or gas phase and the apparatus of the present invention is not limited in its application as to the type of fluid that is carried within the line. For explanatory purposes, however, the unit is shown in FIG. 2 fitted upon a standard three-quarter inch copper line of the type normally used to bring domestic water into a building. It should be further noted that the pressure in the line may vary dramatically depending on many factors, such as the system's application and the height of the building so that the unit can be called upon to seal off lines carrying fluids under a wide range of pressures. Because of the unique design of the present closure unit, the unit is able to provide a positive seal over a wide range of pressures without causing serious harm to the existing line.

Basically, the component parts of the unit are all contained within a hollow sleeve 12 that includes a cylindrical upper body section 13 and a lower nose cone section 14 that tapers inwardly toward the lower opening 15 of the sleeve. The wall thickness of the sleeve is generally uniform throughout with the lower opening providing sufficient clearance to enable the line 11 to pass freely into the sleeve.

A collapsible jaw means, generally referenced 17, is slidably received within the nose cone of the sleeve with the jaw means being capable of encircling the line as illustrated in FIG. 2. Although the jaw means can take any suitable form, it is herein shown as being constructed of three individual locking segments 20—20 that are of symmetrical construction and which are equally spaced about the axis of the sleeve. The locking segments are co-joined by means of a spring washer 21 which is mounted in radially extended grooves 22—22 recessed into the inner wall of each segment. In assembly, the spring washer delivers an outwardly acting biasing force against each segment that urges the segments into light holding contact against the inside surface of the nose cone. This biasing force prevents the segments from becoming turned or twisted in assembly as well as preventing the segments from falling out of the sleeve when the unit is lying in storage in a tool box or the like or when being handled prior to mounting upon a line.

The back surface 25—25 of each locking segment which faces the nose cone section of the sleeve is also provided with a taper that compliments that of the nose cone whereby the segments can be securely seated within the nose cone section. As will be explained in greater detail below, the locking segments are arranged to be moved axially within the sleeve while they are riding in contact with the inclined surface of the nose cone. Accordingly, a radial motion is also imparted to the segments whereby they will move toward and away from the fluid line along a path of travel that is substantially normal to the axis of the sleeve. The front surface 27—27 of each locking segment that faces the fluid line is serrated to furnish a number of rows of knife-edge teeth that are adapted to bite into the side wall of the line as the jaw means is collapsed inwardly. The teeth are profiled so that they will deliver high axial holding power with minimum penetration of the line wall. The length of the sleeve is such that the jaw teeth enter the line well down from the open end thereof. As a consequence of this arrangement, the upper end of the line is not adversely affected by the unit and once the unit is removed, a new section can be immediately joined to the line using conventional joining techniques without having to cut away any part thereof.

Referring once again to the drawings, a cup 30, which is in the form of a right angle cylinder, is slidably mounted in an inverted position within the upper body section of the sleeve directly over the jaw means. In practice, the rim of the cup is passed over the open end of the line whereby the end of the line is generally enclosed within the cup as shown in FIG. 2. A compressible seal assembly, generally referenced 31, is housed beneath the cup and encompasses the line to provide a close sliding fit therebetween. When compressed, the assembly will create a fluid-tight barrier between the line and the cup which prevents fluid under pressure from leaking therebetween. In the present embodiment of the invention, the seal assembly includes three resilient O-rings 32—32 that are separated by two relatively non-compressible washers 33—33. The O-rings and washers are stacked upon a bottom spacer 34 of tubular form which, in assembly, is seated upon the top end face 36 of the jaw means. A flat disc-like gasket 35 is fitted over the assembly between the bottom wall 53 of the cup and the terminal end of the fluid line. When the seal is in a non-compressed condition as shown in FIG. 2, the outer rim 37 of the cup is supported a predetermined distance above the top surface of the jaw means by the assembly.

A cam lever 40 for controlling the positioning of the cup is rotatably mounted in the upper section of the sleeve upon a pivot pin 41. The lever is provided with a hole 42 through which the pin is passed and is secured thereto by means of a set screw 47 so that the lever turns with the pin. The outboard ends of the pin are passed with a close-sliding fit into radially aligned holes 43—43 formed in the side wall of the sleeve. In assembly, the body of the cam lever is cradled within two axially aligned cutouts 45—45 passed downwardly from the top rim of the sleeve so that the lever may be rotated in a vertical plane between two operative positions.

The cam lever is composed of an extended handle 50 and an arcuate-shaped body 51 having a contoured camming surface 52 that is arranged to move into sliding relationship with the bottom wall 53 of the cup as the handle is moved from a first operative position as shown in FIG. 2 in a clockwise direction toward a second operative position. The camming surface is specifically profiled so that initially it is held out of contact with the cup when the handle is in a vertical position. Turning of the handle, however, causes the camming surface to be brought into contact with the bottom of the cup thereby driving the cup down in the sleeve towards the jaw means. The initial downward movement of the cup causes the seal assembly to bottom against the top of the jaw means and the O-rings to become compressed between the washers. At the same time, the flat gasket overlying the seal assembly is pressured into closing contact against the open end of the fluid line. The axial length of the lower spacer in the assembly is such that the O-rings are compressed into sealing contact between the walls of the cup and the line before the bottom rim 57 of the cup contacts the top of the jaw means. The combined action of the O-rings and the gasket, upon compression of the seal, is such as to prevent high pressure fluids from leaking from the line.

Further rotation of the camming lever brings the rim 57 of the cup into driving contact against the upper end face 36 of the jaw means. The camming surface now in effect translates a force against the jaw means that forces the locking segment down into the tapered nose cone of the sleeve. This, in turn, moves the segments inwardly in a radial direction whereupon the teeth penetrate into the side wall of the line. A symmetrical motion is imparted to each of the segments which produces a uniform bite about the entire periphery of the line. With the teeth locked to the line, the entire closure unit is held in a stationary sealing position relative to the line which cannot be disturbed until such time as the lever arm is rotated in a counter clockwise direction. Only a slight amount of penetration by the jaw teeth will enable the unit to withstand relatively high line pressure without failure.

While this invention has been described with reference to the structure disclosed herein, it is not confined to the details as set forth and this application is intended to cover any modifications or changes as may come within the scope of the following claims.

We claim:

1. A quick-acting closure device for temporarily sealing off the open end of a line used to convey fluids under pressure including a hollow sleeve having a cylindrical upper section and an inwardly tapered lower section that is capable of being passed over the open end of a line, collapsible jaw means slidably contained within the lower section of the sleeve that encircles the line, said jaw means being collapsible in a radial direction to grip the line therein when the jaw means is moved downwardly within the tapered section of the sleeve, a cup that is slidably contained within the upper section of the sleeve that is adapted to pass over the open end of the line so that the rim of the cup is able to move into contact with the jaw means, a compressible seal means contained within the cup that surrounds the line and is arranged to be compressed between the cup and the jaw means as the cup is moved downwardly in the sleeve to provide a fluid-tight seal about the open end of said line and a camming means acting between the sleeve and the cup that is adapted to force the cup downwardly in the sleeve to compress the seal assembly and drive the jaw means into the tapered section of the sleeve whereby the jaw means grip the line and secure the device in a sealing condition.

2. The quick-acting closure device of claim 1 wherein said seal means includes a plurality of resilient rings that are separated by rigid washers to form a stacked assembly extending between the bottom wall of the cup and the top of the jaw means.

3. The quick-acting closure device of claim 2 wherein the non-compressed length of the assembly is slightly longer than the depth of the cup whereby the resilient rings are compressed between the walls of the cup and the line prior to the rim of the cup contacting the jaw means.

4. The quick-acting closure device of claim 2 wherein a flat disc-shaped gasket is fitted over the top of the stacked assembly whereby the gasket is forced over the open end of the line when the assembly is compressed.

5. The quick-acting closure device of claim 1 wherein the jaw means includes a plurality of locking segments spaced about the perimeter of the line.

6. The quick-acting closure device of claim 5 wherein each locking segment contains a tapered back wall that faces the tapered section of said sleeve and knife-edge teeth formed in the front wall thereof facing the line whereby said teeth move radially into the line as the segments are moved downwardly against said tapered section.

7. The quick-acting closure device of claim 1 wherein said camming means includes a lever arm rotatably supported in the upper section of said sleeve having a contoured camming surface formed therein to move into contact with the bottom wall of the cup to drive the cup downwardly in the sleeve when the lever arm is rotated in a first direction.

8. The quick-acting closure device of claim 5 that further includes a biasing means acting upon the locking segments to urge the segments outwardly in a radial direction against the wall of said sleeve.

9. The quick-acting device of claim 8 wherein said biasing means is a spring washer that is mounted in a radial groove formed in each of the locking segments.

10. The quick-acting device of claim 1 wherein said cup is a right angle cylinder.

* * * * *